(12) United States Patent
Maze et al.

(10) Patent No.: US 11,346,824 B2
(45) Date of Patent: May 31, 2022

(54) SIMPLIFIED SOURCE CONTROL INTERFACE

(71) Applicant: Thermo Finnigan LLC, San Jose, CA (US)

(72) Inventors: Joshua T. Maze, Round Rock, TX (US); Scott T. Quarmby, Round Rock, TX (US)

(73) Assignee: THERMO FINNIGAN LLC, San Jose, CA (US)

( * ) Notice: Subject to any disclaimer, the term of this patent is extended or adjusted under 35 U.S.C. 154(b) by 42 days.

(21) Appl. No.: 17/082,787

(22) Filed: Oct. 28, 2020

(65) Prior Publication Data
US 2021/0072204 A1 Mar. 11, 2021

Related U.S. Application Data

(62) Division of application No. 15/394,240, filed on Dec. 29, 2016, now Pat. No. 10,823,714.

(51) Int. Cl.
*G01N 30/86* (2006.01)
*H01J 49/00* (2006.01)
(Continued)

(52) U.S. Cl.
CPC ..... *G01N 30/8658* (2013.01); *G01N 30/7266* (2013.01); *H01J 49/00* (2013.01); *H01J 49/0036* (2013.01); *H01J 49/167* (2013.01)

(58) Field of Classification Search
CPC .............. G01N 30/86; G01N 30/8658; G01N 30/7266; G01N 27/62; H01J 49/00; H01J 49/0036; H01J 49/167
See application file for complete search history.

(56) References Cited

U.S. PATENT DOCUMENTS 5,025,391 A   6/1991  Filby et al.
5,970,804 A * 10/1999  Robbat, Jr. ......... H01J 49/0027
                                              73/23.41
(Continued)

FOREIGN PATENT DOCUMENTS

CA      2593498 A1     2/2008
CN    101887087 A     11/2010
(Continued)

OTHER PUBLICATIONS

AB Sciex, API 4000 LC/MS/MS System Hardware Manual, 2010, pp. 1-110.
(Continued)

*Primary Examiner* — Tung S Lau
(74) *Attorney, Agent, or Firm* — David A. Schell (57) ABSTRACT

A mass spectrometry system having a simplified control interface includes a processor and a memory. The memory includes instructions that when executed cause the processor to perform the steps of providing a user interface including a plurality of adjustment elements for adjusting at least one results effective parameter and at least one sample descriptive parameter; determining a plurality of instrument control parameters based on the at least one results effective parameter and the at least one sample descriptive parameter; and analyzing a sample while operating according to the plurality of instrument control parameters.

2 Claims, 9 Drawing Sheets

(51) Int. Cl.
*G01N 30/72* (2006.01)
*H01J 49/16* (2006.01)

(56) References Cited

U.S. PATENT DOCUMENTS

| | | | |
|---|---|---|---|
| 5,986,259 A | 11/1999 | Hirabayashi et al. | |
| 6,250,132 B1* | 6/2001 | Drzewiecki | A61M 16/0051 73/24.05 |
| 6,272,905 B1* | 8/2001 | Drzewiecki | A61M 16/0051 73/30.01 |
| 6,305,212 B1* | 10/2001 | Drzewiecki | A61M 16/085 73/61.79 |
| 7,355,172 B2 | 4/2008 | Matsui et al. | |
| 8,115,930 B2 | 2/2012 | Anderson, Jr. et al. | |
| 8,305,582 B2 | 11/2012 | Anderson et al. | |
| 9,500,623 B2 | 11/2016 | Cooks et al. | |
| 9,511,142 B2 | 12/2016 | Burns et al. | |
| 9,601,321 B2 | 3/2017 | Kaneko et al. | |
| 2004/0035183 A1* | 2/2004 | O'Brien | G01N 1/2202 73/431 |
| 2005/0258360 A1 | 11/2005 | Whitehouse et al. | |
| 2006/0272384 A1* | 12/2006 | Lewis | G01F 25/10 73/1.16 |
| 2007/0016379 A1 | 1/2007 | Seymour | |
| 2007/0164209 A1 | 7/2007 | Balogh | |
| 2007/0176088 A1 | 8/2007 | Li | |
| 2008/0204757 A1* | 8/2008 | Manning | G01N 21/1702 356/451 |
| 2009/0101814 A1 | 4/2009 | Amirav | |
| 2010/0176290 A1* | 7/2010 | Vidal-De-Miguel | H01J 49/0422 250/288 |
| 2013/0191033 A1 | 7/2013 | Morgner | |
| 2014/0326875 A1 | 11/2014 | Asano | |
| 2015/0069254 A1* | 3/2015 | Fernandez | H01J 49/025 250/389 |
| 2015/0249001 A1 | 9/2015 | Piper | |
| 2015/0325423 A1 | 11/2015 | Ouyang et al. | |
| 2016/0128929 A1 | 5/2016 | Bongers et al. | |

FOREIGN PATENT DOCUMENTS

| | | |
|---|---|---|
| CN | 103364483 A | 10/2013 |
| CN | 103472167 A | 12/2013 |
| CN | 104025248 A | 9/2014 |
| JP | 2009086837 A | 4/2009 |
| WO | 2006/009904 | 1/2006 |

OTHER PUBLICATIONS

Advion, "CheMS", URL: https://web.archive.org/web/20160805112254/ http://advion.com/products/expression/software-mass-express-data-express/chems/, 2016, 1 page.

Cox et al., "Improving the Sensitivity of Mass Spectrometry by Using a New Sheath Flow Electrospray Emitter Array at Subambient Pressures", J. Am. Soc. Mass Spectrom., 2014 (25), pp. 2028-2037.

Micromass UK Limited, "Q-Tof 2 User's Guide", URL: https://www.concordia.ca/content/dam/artsci/research/cbams/docs/Qtofusersguide.pdf, 2011, pp. 43-76.

Monge et al., "Mass Spectrometry: Recent Advances in Direct Open Air Surface Sampling /Ionization", Chemical Reviews 2013, 113, pp. 2269-2308.

Reynolds et al., "A Computer Operated Mass Spectrometer System", Anal Chem, vol. 42 (11), 1970, 1122-1129.

Shimadzu, "LC/MS/MS Interface Setting Support Software", URL: https://web.archive.org/web/20160704221641/https://www.shimacizu.eu.com/lcmsms-interface-setting-support-software, 2016, pp. 1-5.

Short et al., "Field Chemical Analysis Using Real-Time In-Water Mass Spectrometry", Oceans, 2001, MTS/IEEE Conference and Exhibition, pp. 256-258.

Wang, "Research on Miniature MS Human-Computer Interaction System", Chinese Master's Theses, Full-text Database EngineeringScience and Technology II Issue 5, 2011, 24 pages.

\* cited by examiner

SIMPLIFIED SOURCE CONTROL INTERFACE

CROSS-REFERENCE TO RELATED APPLICATION

This application is a divisional application under 35 U.S.C. § 121 and claims the priority benefit of co-pending U.S. patent application Ser. No. 15/394,240, filed Dec. 29, 2016. The disclosure of the foregoing application is incorporated herein by reference in its entirety.

FIELD

The present disclosure generally relates to the field of mass spectrometry including a simplified source control interface.

INTRODUCTION

Mass spectrometry is an analytical chemistry technique that can identify the amount and type of chemicals present in a sample by measuring the mass-to-charge ratio and abundance of gas-phase ions. Typically, ions produced in an ion source travel along a path from an ion source to a mass analyzer. Obtaining an optimal result often requires adjusting numerous settings that control the ion source, such as various gas flows, temperatures, current, and other items. This can often require specialized knowledge of the instrument and mass spectrometry. The array of settings can make the use of mass spectrometry intimidating to a user that may be more knowledgeable about their sample and their data requirements than the effect of individual instrument parameters on their data obtained. As such, there is a need for new systems and methods to configure mass spectrometry instruments including a simplified source control interface.

SUMMARY

In a first aspect, a mass spectrometry system having a simplified control interface can include a processor and a memory. The memory can include instructions that when executed cause the processor to perform the steps of: providing a user interface including a plurality of adjustment elements for adjusting at least one results effective parameter or at least one sample descriptive parameter; determining a plurality of instrument control parameters based on the at least one results effective parameter and the at least one sample descriptive parameter; and analyzing a sample while operating according to the plurality of instrument control parameters.

In various embodiments of the first aspect, the number of the determined instrument control parameters can be greater than the number of results effective parameters and sample descriptive parameters.

In various embodiments of the first aspect, the at least one results effective parameter can include desired sensitivity.

In various embodiments of the first aspect, the at least one sample descriptive parameter can include volatility of a sample solvent or stability of a target compound.

In various embodiments of the first aspect, the instrument control parameters can include nebulizing gas flow, desolvation gas flow, sweep gas flow, desolvation gas temperature, ion inlet temperature, spray voltage, source collision induced dissociation, or any combination thereof.

In various embodiments of the first aspect, the adjustment elements can include sliders, knobs, or any combination thereof.

In a second aspect, a method for operating a mass spectrometry system with a simplified control interface can include providing a user interface including a plurality of adjustment elements for adjusting at least one results effective parameter or at least one sample descriptive parameter; determining a plurality of instrument control parameters based on the at least one results effective parameter and the at least one sample descriptive parameter; and analyzing a sample while operating according to the plurality of instrument control parameters.

In various embodiments of the second aspect, the number of the determined instrument control parameters can be greater than the number of results effective parameters and sample descriptive parameters.

In various embodiments of the second aspect, the at least one results effective parameter can include desired sensitivity.

In various embodiments of the second aspect, the at least one sample descriptive parameter can include volatility of a sample solvent or stability of a target compound.

In various embodiments of the second aspect, the instrument control parameters can include nebulizing gas flow, desolvation gas flow, sweep gas flow, desolvation gas temperature, ion inlet temperature, spray voltage, source collision induced dissociation, or any combination thereof.

In various embodiments of the second aspect, the adjustment elements can include sliders, knobs, or any combination thereof.

In a third aspect, a method for operating a mass spectrometry system with a simplified control interface can include receiving a sensitivity/robustness setting, a solvent volatility setting, a compound stability setting from a user, or any combination thereof, and determining a plurality of instrument control parameters based on the received settings. The plurality of instrument control parameters can include a nebulizing gas flow, a desolvation gas flow, a sweep gas flow, a desolvation gas temperature, an ion inlet temperature, or any combination thereof. The method can further include setting the flow rates and/or temperatures of the mass spectrometry system in accordance with the plurality of instrument control parameters.

In various embodiments of the third aspect, the number of the determined instrument control parameters is greater than the number of received settings.

In a fourth aspect, a mass spectrometry system can include a processor and a memory. The memory can include instructions that when executed cause the processor to perform the steps of determining one or more instrument control parameters based upon a chromatographic liquid flow rate; providing a user interface including one or more adjustment elements for adjusting at least one results effective parameter or at least one sample descriptive parameter; adjusting the instrument control parameters based on the at least one results effective parameter or at least one sample descriptive parameter; and analyzing a sample while operating according to the plurality of instrument control parameters.

In various embodiments of the fourth aspect, the number of the determined instrument control parameters is greater than the number of results effective parameters and sample descriptive parameters.

In various embodiments of the fourth aspect, the at least one results effective parameter includes desired sensitivity.

In various embodiments of the fourth aspect, the at least one sample descriptive parameter includes volatility of a sample solvent or stability of a target compound.

In various embodiments of the forth aspect, the instrument control parameters include nebulizing gas flow, desolvation gas flow, sweep gas flow, desolvation gas temperature, ion inlet temperature, spray voltage, source collision induced dissociation, or any combination thereof.

In various embodiments of the fourth aspect, the adjustment elements include sliders, knobs, or any combination thereof.

DRAWINGS

For a more complete understanding of the principles disclosed herein, and the advantages thereof, reference is now made to the following descriptions taken in conjunction with the accompanying drawings and exhibits, in which.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DESCRIPTION OF VARIOUS EMBODIMENTS

Embodiments of systems and methods for ion isolation are described herein and in the accompanying exhibits.

The section headings used herein are for organizational purposes only and are not to be construed as limiting the described subject matter in any way.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless described otherwise, all technical and scientific terms used herein have a meaning as is commonly understood by one of ordinary skill in the art to which the various embodiments described herein belongs.

It will be appreciated that there is an implied "about" prior to the temperatures, concentrations, times, pressures, flow rates, cross-sectional areas, etc. discussed in the present teachings, such that slight and insubstantial deviations are within the scope of the present teachings. In this application, the use of the singular includes the plural unless specifically stated otherwise. Also, the use of "comprise", "comprises", "comprising", "contain", "contains", "containing", "include", "includes", and "including" are not intended to be limiting. It is to be understood that both the foregoing general description and the following detailed description are exemplary and explanatory only and are not restrictive of the present teachings.

As used herein, "a" or "an" also may refer to "at least one" or "one or more." Also, the use of "or" is inclusive, such that the phrase "A or B" is true when "A" is true, "B" is true, or both "A" and "B" are true. Further, unless otherwise required by context, singular terms shall include pluralities and plural terms shall include the singular.

A "system" sets forth a set of components, real or abstract, comprising a whole where each component interacts with or is related to at least one other component within the whole.

Mass Spectrometry Platforms

Figure 1:
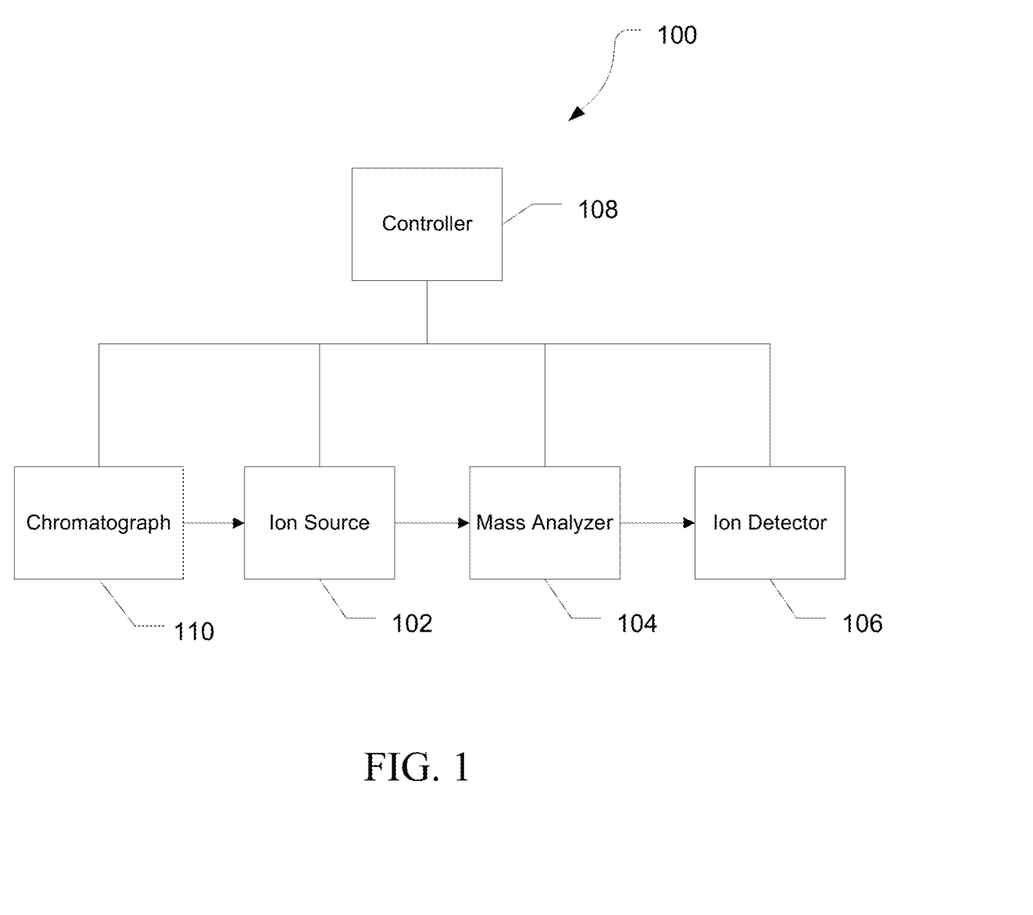
FIG. 1 is a block diagram of an exemplary mass spectrometry system, in accordance with various embodiments.

Various embodiments of mass spectrometry platform 100 can include components as displayed in the block diagram of FIG. 1. In various embodiments, elements of FIG. 1 can be incorporated into mass spectrometry platform 100. According to various embodiments, mass spectrometer 100 can include an ion source 102, a mass analyzer 104, an ion detector 106, and a controller 108.

In various embodiments, the ion source 102 generates a plurality of ions from a sample. The ion source can include, but is not limited to, a matrix assisted laser desorption/ionization (MALDI) source, electrospray ionization (ESI) source, heated electrospray ionization (HESI) source, atmospheric pressure chemical ionization (APCI) source, atmospheric pressure photoionization source (APPI), inductively coupled plasma (ICP) source, electron ionization source, chemical ionization source, photoionization source, glow discharge ionization source, thermospray ionization source, and the like.

In various embodiments, the mass analyzer 104 can separate ions based on a mass to charge ratio of the ions. For example, the mass analyzer 104 can include a quadrupole mass filter analyzer, a quadrupole ion trap analyzer, a time-of-flight (TOF) analyzer, an electrostatic trap (e.g., ORBITRAP) mass analyzer, Fourier transform ion cyclotron resonance (FT-ICR) mass analyzer, and the like. In various embodiments, the mass analyzer 104 can also be configured to fragment the ions using collision induced dissociation (CID) electron transfer dissociation (ETD), electron capture dissociation (ECD), photo induced dissociation (PID), surface induced dissociation (SID), and the like, and further separate the fragmented ions based on the mass-to-charge ratio.

In various embodiments, the ion detector 106 can detect ions. For example, the ion detector 106 can include an electron multiplier, a Faraday cup, and the like. Ions leaving the mass analyzer can be detected by the ion detector. In various embodiments, the ion detector can be quantitative, such that an accurate count of the ions can be determined.

In various embodiments, the controller 108 can communicate with the ion source 102, the mass analyzer 104, and the ion detector 106. For example, the controller 108 can configure the ion source or enable/disable the ion source. Additionally, the controller 108 can configure the mass analyzer 104 to select a particular mass range to detect. Further, the controller 108 can adjust the sensitivity of the ion detector 106, such as by adjusting the gain. Additionally, the controller 108 can adjust the polarity of the ion detector 106 based on the polarity of the ions being detected. For example, the ion detector 106 can be configured to detect positive ions or be configured to detected negative ions.

In various embodiments, the system can be coupled with a chromatography device 110. The chromatography device 110 can include a gas chromatograph (GC), a liquid chromatograph (LC), such as an HPLC or a UPLC, or the like. The chromatography device can separate components of a sample according to the retention times of the individual components within the column. In various embodiments, the chromatography column can include a material that interacts with at least some of the components of the sample. The interactions between the components and the column material can retard the flow of the components through the column, resulting in a retention time that is a function of the extent of the interaction between the component and the column material. The interactions can be based on a size of the component, a hydrophobicity of the component, the charge of the component, an affinity of the column material for the component, or the like. As such, the column can at least partially separate components of the sample from one another.

Electrospray Source

Figure 2:
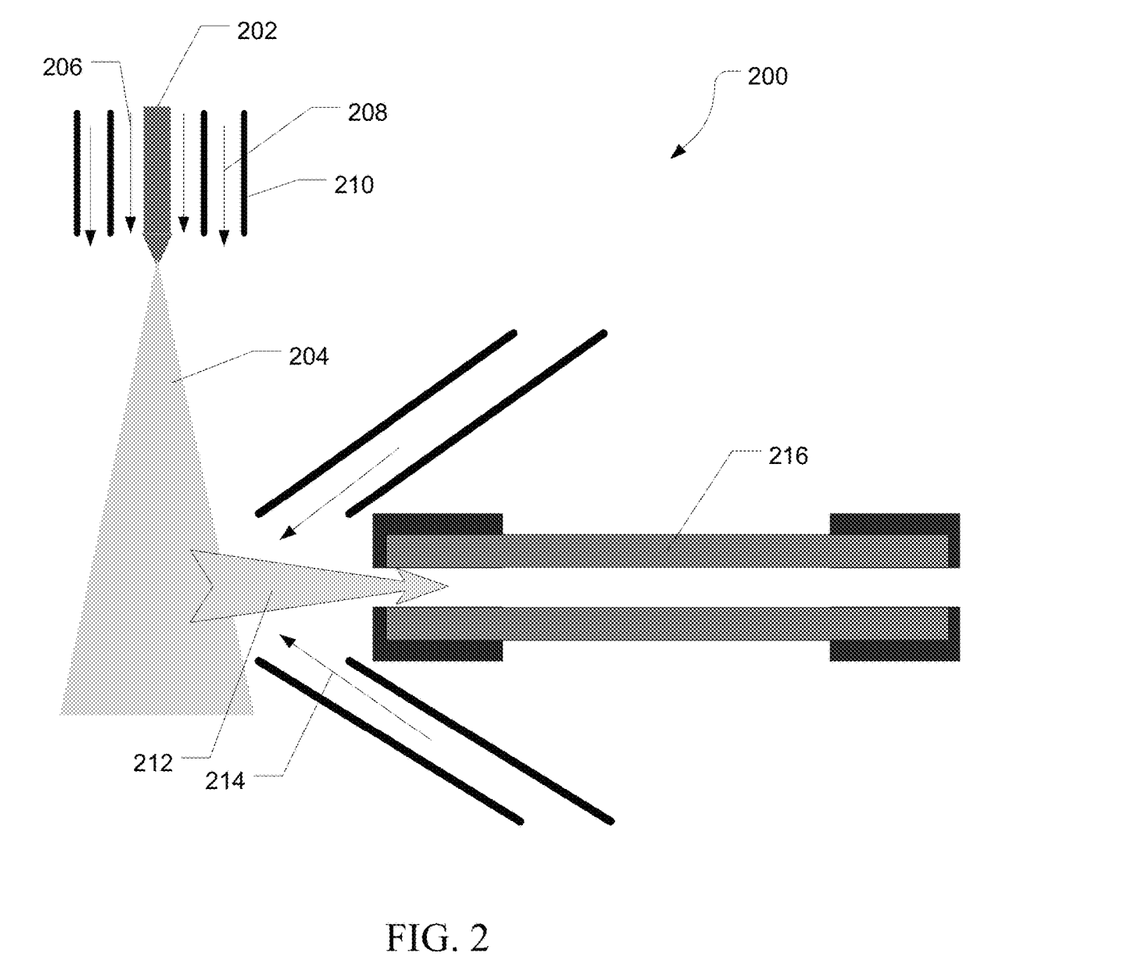
FIG. 2 is a diagram of an exemplary electrospray ionization source, in accordance with various embodiments.

FIG. 2 is an exemplary heated electrospray source 200. Liquid sample, usually supplied from a chromatograph, is introduced through capillary 202. A high voltage potential is applied to the end of capillary 202 to cause the liquid sample to form a Taylor Cone. Droplets are ejected from the Taylor cone and form a spray 204. Within the spray 204, droplets continue to break apart forming smaller and smaller droplets until components of the sample are ionized. A nebulizing gas flow 206 can be supplied to aid in droplet formation. An additional desolvation gas flow 208 can be supplied to aid in vaporization of the solvent. Additionally, desolvation gas temperature can be controlled by a heater 210.

As the droplets shrink in size, fine droplets and gas phase ions 212 can be drawn from the spray 204 and into an ion inlet. The flow of the fine droplets and gas phase ions 212 can be regulated by a sweep gas 214. Once in the ion inlet, the fine droplets and gas phase ions 212 can travel down a transfer tube 216 to a mass analyzer (not shown). The transfer tube 214 can be heated to provide further desolvation of the fine droplets and gas phase ions 202 such that when they leave the transfer tube 216, the flow consists essentially of neutral gas molecules and gas phase ions. In various embodiments, source collision induced dissociation (CID) can occur at the exit of the transfer tube 216 by accelerating the ions into the neutral gas resulting in collisions that remove adducts of the sample ions. The source CID can be controlled by the velocity of the ions exiting the transfer tube 216 which is regulated by the relative potentials of the ion transfer tube and an ion lens (not shown).

Simplified Control Interface

Figure 3A:
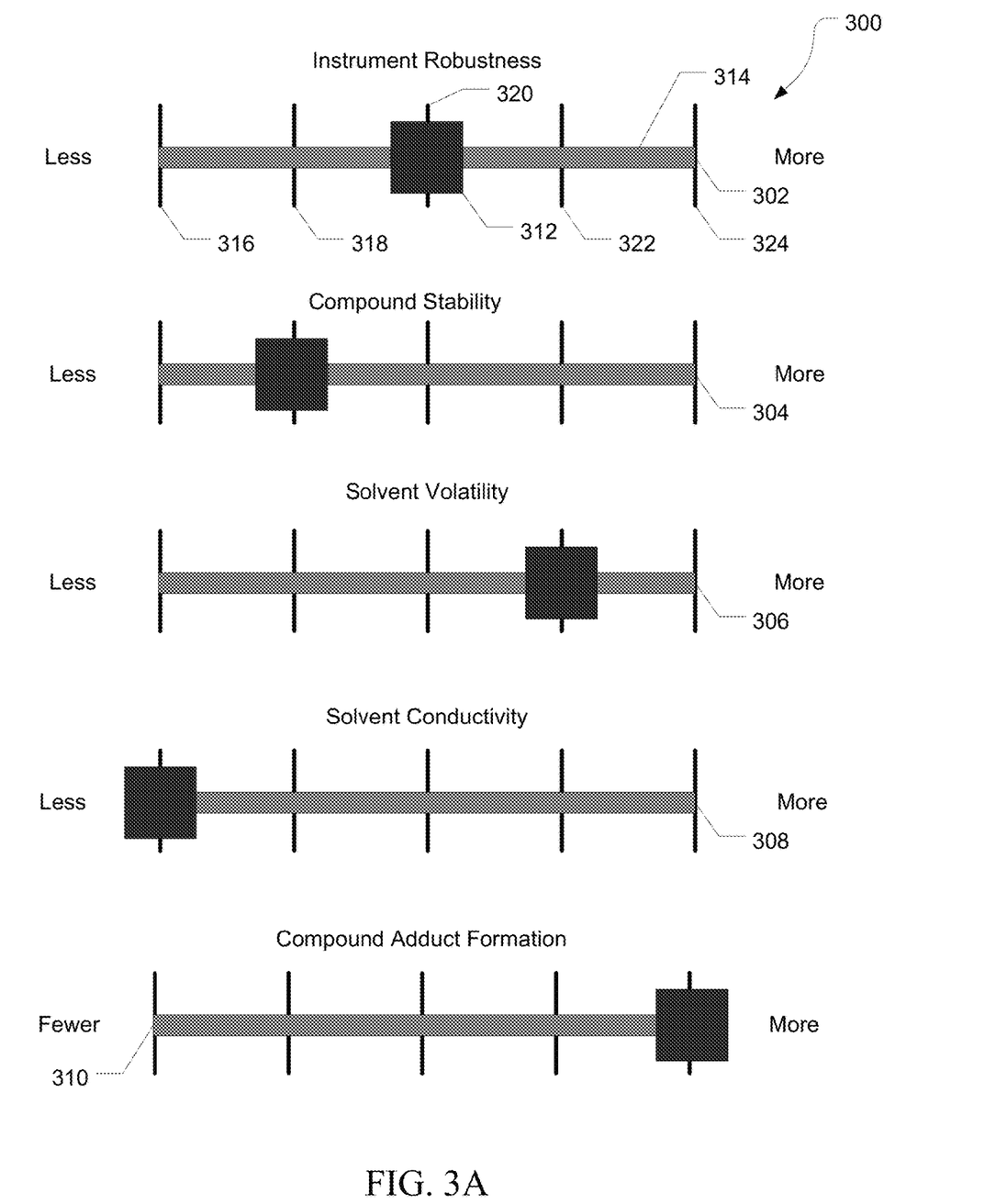
FIGS. 3A and 3B are drawings illustrating exemplary selection elements of a simplified source control interface, in accordance with various embodiments.

FIG. 3A illustrates an exemplary user interface 300 including a plurality of sliders 302, 304, 306, 308, and 310. Slider 302 includes a selector 312, a slider track 314, and a plurality of position marks 316, 318, 320, 322, and 324. Sliders 304, 306, 308, and 310 can include similar elements not numbered for simplicity. Slider 302 can set a results effective variable, such as instrument robustness. Sliders 304, 306, 308, and 310 can set sample descriptive parameters, such as compound stability, propensity of a compound to form adducts, solvent volatility, or solvent conductivity.

Figure 3B:
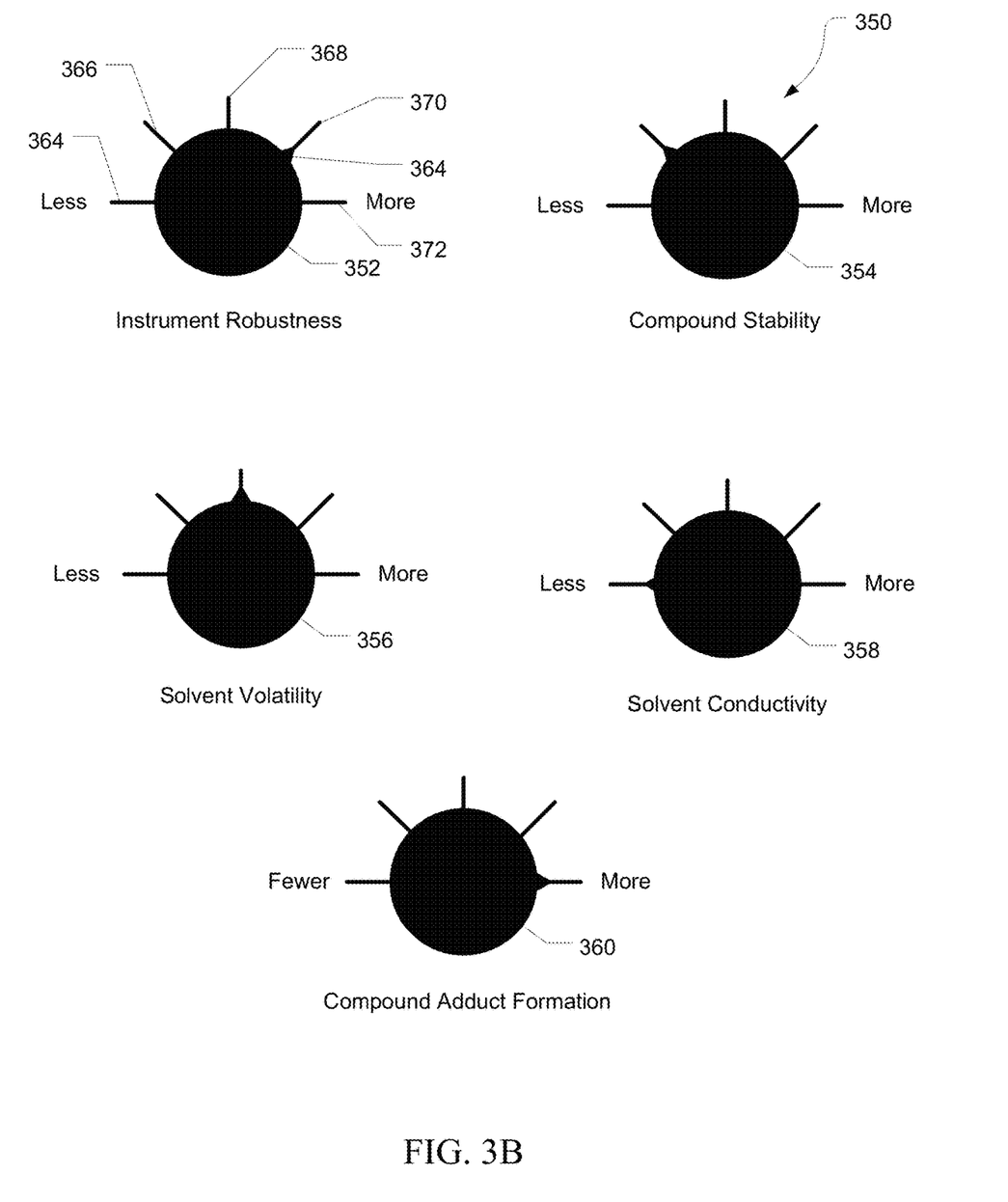

FIG. 3B illustrates an exemplary user interface 350 including a plurality of knobs 352, 354, 356, 358, and 360. Knob 352 includes a dial 362 and a plurality of position marks 364, 366, 368, 370, and 372. Knobs 354, 356, 358, and 360 can include similar elements not numbered for simplicity. Knob 352 can set a results effective variable, such as instrument robustness. Knobs 354, 356, 358, and 360 can set sample descriptive parameters, such as compound stability, propensity of a compound to form adducts, solvent volatility, or solvent conductivity.

In various embodiments, increasing the robustness can increase the number of consecutive runs that can be performed without cleaning instrument components such as the ion transfer tube, ion inlet, and the like. This can result in a higher utilization of the instrument, but can decrease sensitivity. It can be desirable to alternate between a more robust setting for routine analysis of samples with a relatively higher concentration of compounds of interest, and a less robust setting when increased sensitivity is needed for samples with a relatively lower concentration of compounds of interest. In various embodiments, increasing the robustness setting can increase a sweep gas flow.

In various embodiments, compound stability can describe the thermal stability of a compound of interest in a sample, or the propensity of the compound to degrade at high temperature. It can be desirable to avoid thermal degradation of the compound during and after ion formation, such as by reducing the ion inlet temperature.

In various embodiments, the propensity of a compound to form adducts can describe the frequency of adduct formation and the number of potential adducts a compound can form, such as with solvent molecules, salts, and other compounds. Increased adduct formation can complicate mass analysis and it can be desirable to reduce the number of adducts through collision induced dissociation near the source prior to further analysis.

In various embodiments, solvent volatility can describe how quickly a solvent will vaporize or evaporate. For solvents with a lower volatility, it can be desirable to increase the nebulization temperature and increase the flow of nebulization gas and desolvation gas to increase the rate of vaporization.

In various embodiments, solvent conductivity can describe how conductive the solvent is. As electrospray works by applying a high voltage current to the solvent at the electrospray tip, it can be desirable to limit the spray voltage when using a solvent with relatively high conductivity to avoid the solvent from becoming a conductive path for the spray current.

In various embodiments, one or more instrument control parameters may depend on the settings of multiple sample descriptive parameters and results effective parameters. For example, with a low volatility solvent, it can be desirable to increase the desolvation gas temperature, but with a compound with low thermal stability, it can be desirable to avoid exposing the volatilized compound to high temperatures. Thus, compound stability and solvent volatility may both affect the desolvation gas temperature. In another example, instrument robustness and solvent volatility can both affect the desolvation gas flow which can contribute to the vaporization of the solvent. Thus, both solvent volatility and instrument robustness can affect the desolation gas flow needed to volatilize the solvent.

In various embodiments, an operator with limited technical experience with a mass spectrometry system can be more comfortable setting results effective parameters and sample descriptive parameters than determining various instrument control parameters. Using an interface to input results effective parameters and sample descriptive parameters can enable a less experienced operator to use the system effectively without the need for extensive experimentation to optimize the instrument control parameters.

Figure 4:
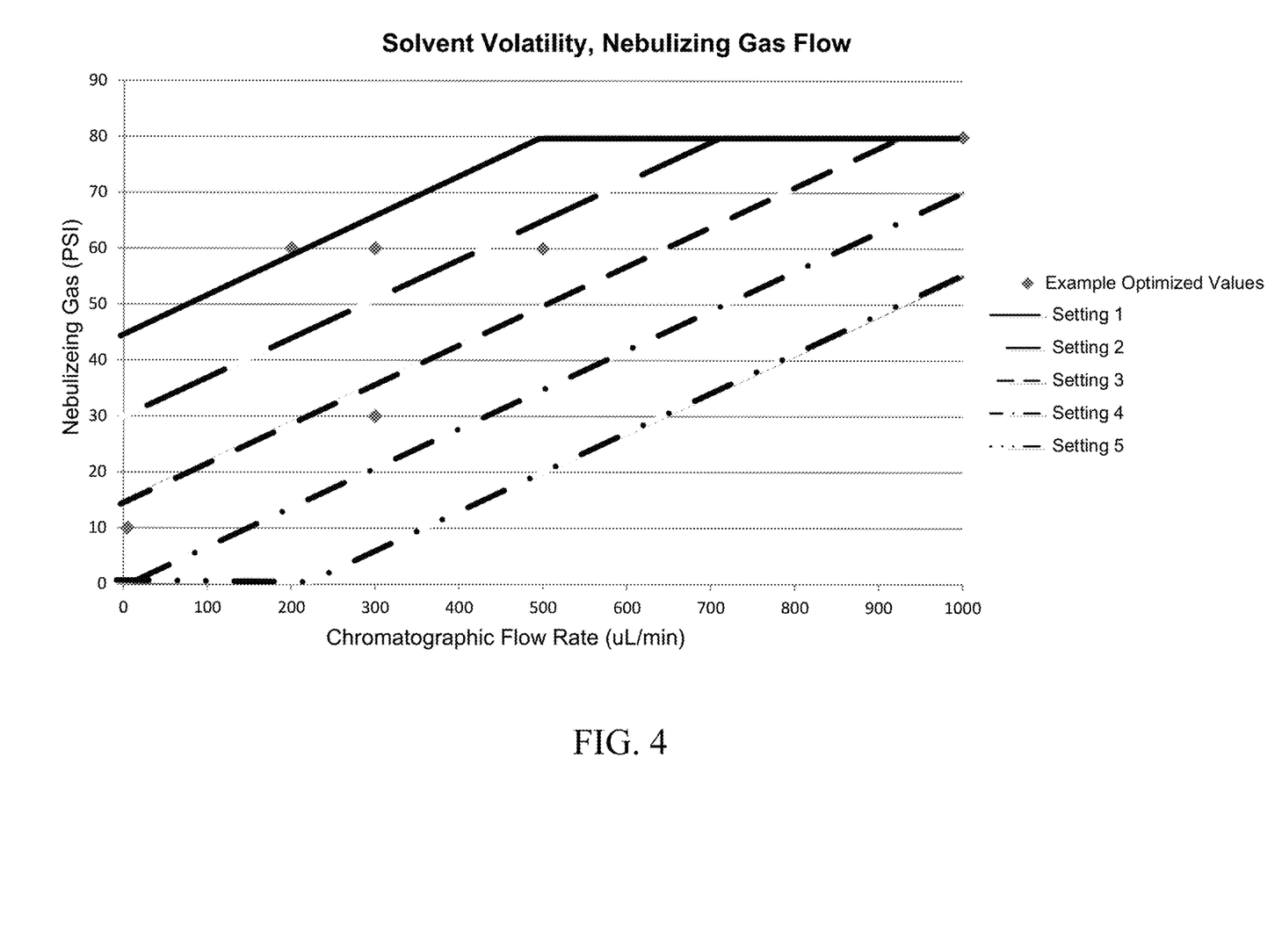
FIGS. 4, 5, and 6 are exemplary graphs illustrating shifts in instrument control parameters as a result of settings of the selection elements, in accordance with various embodiments.

FIG. 4 is a graph illustrating the relationship between a pressure setting and the liquid flow rate from the chromatograph. The relationship between the liquid flow rate and the necessary pressure setting to achieve the optimal signal can be adjusted by changing the solvent volatility setting.

Figure 5:
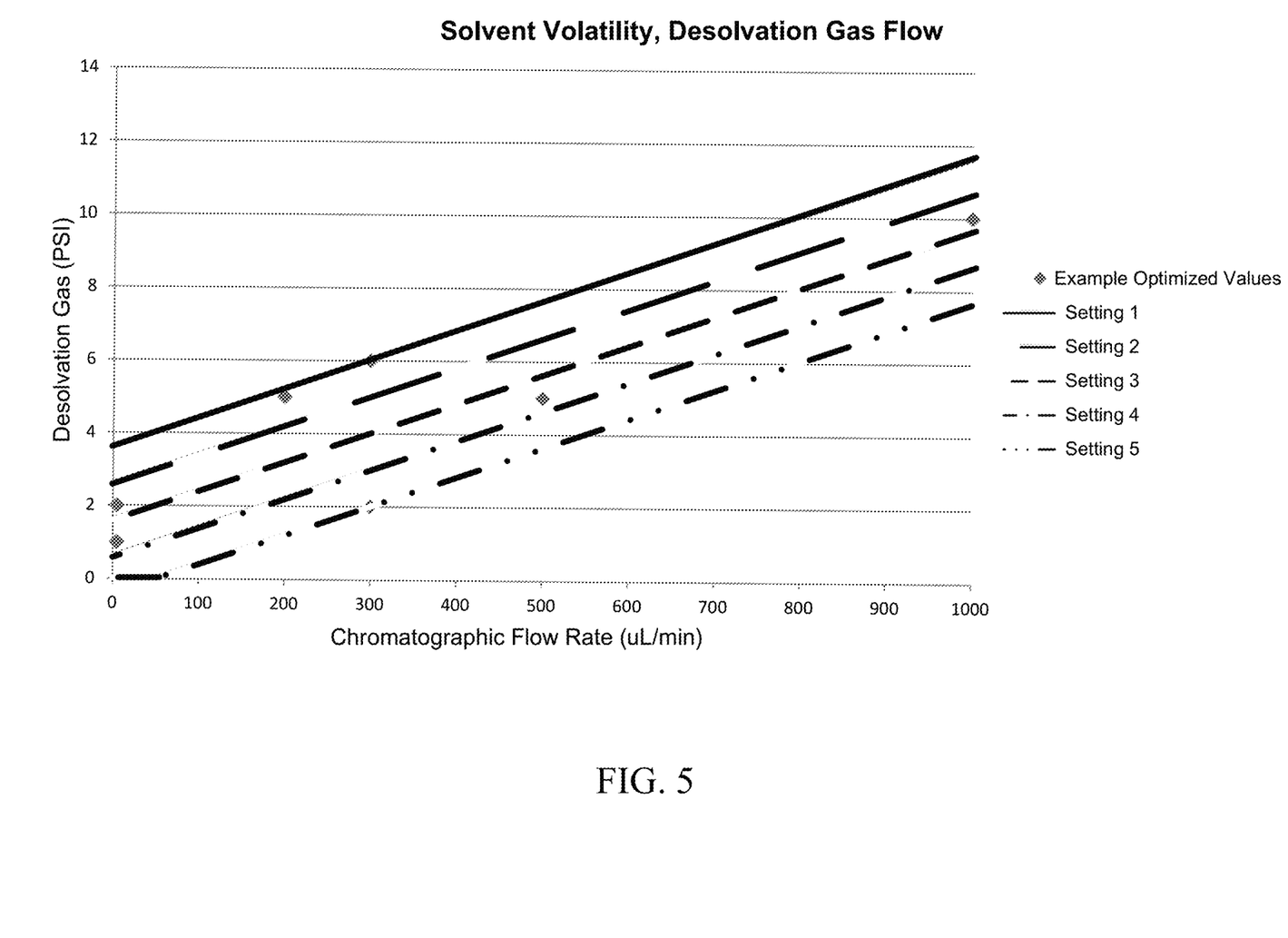

FIG. 5 is a graph illustrating the relationship between a pressure setting and the liquid flow rate from the chromatograph. The relationship between the desired flow and the necessary pressure setting to achieve optimal signal can be adjusted by changing the solvent volatility setting.

Figure 6:
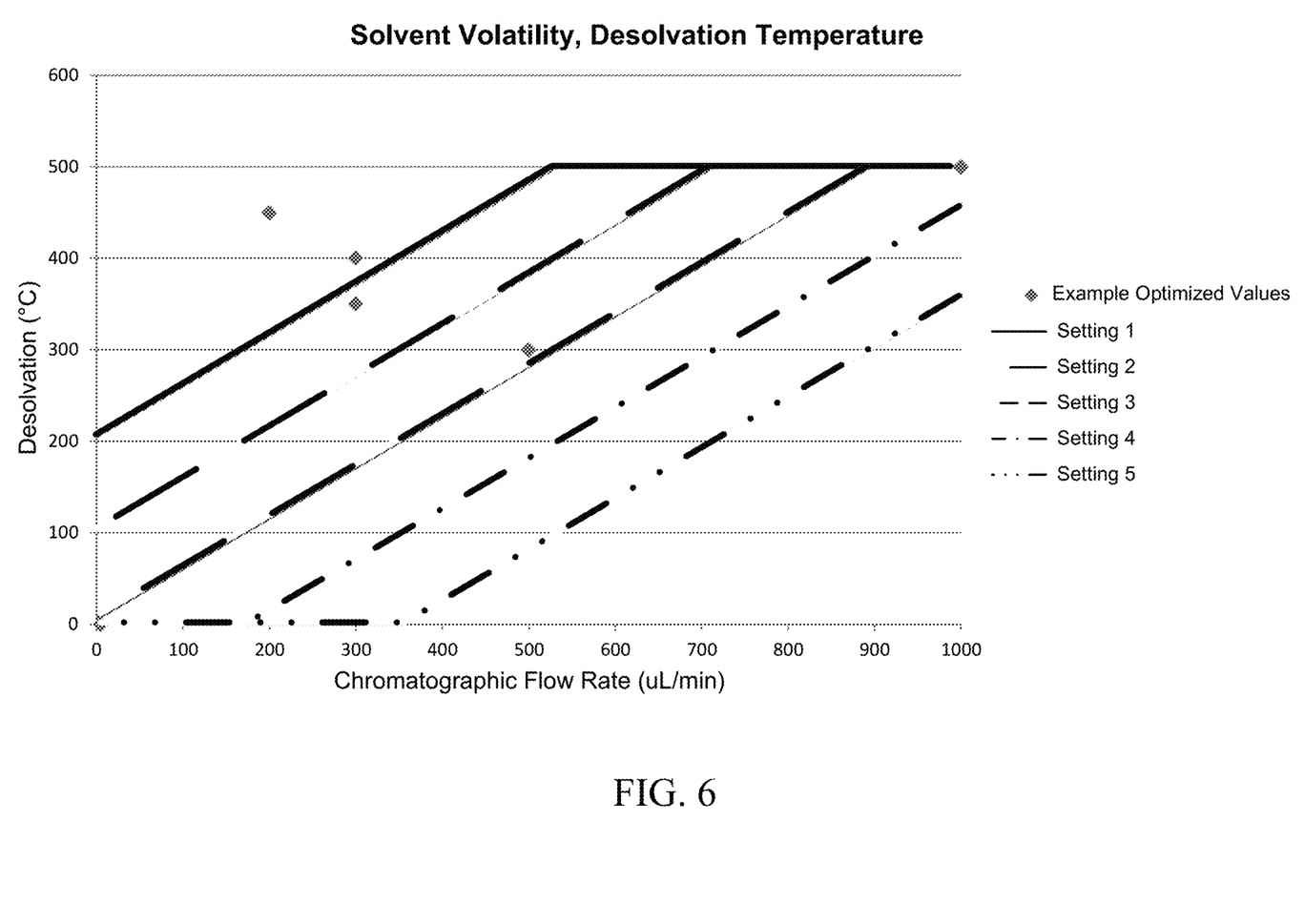

FIG. 6 is a graph illustrating the relationship between a vaporizer temperature setting and the liquid flow rate from the chromatograph. The relationship between the desired flow and the necessary temperature setting to achieve optimal signal can be adjusted by changing the solvent volatility setting.

Figure 7:
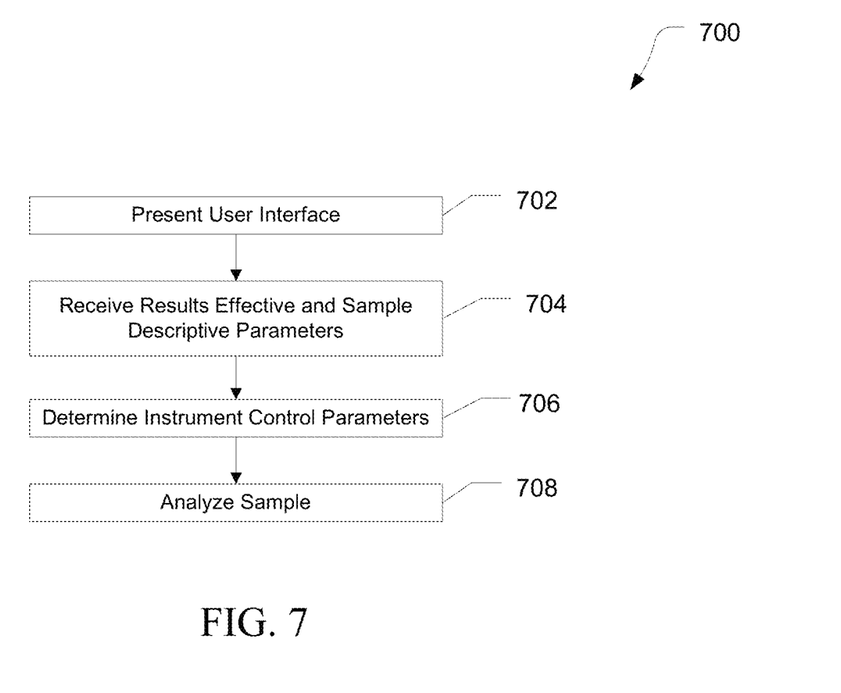
FIG. 7 is a flow diagram illustrating exemplary methods of analyzing a sample, in accordance with various embodiments.

FIG. 7 illustrates a method 700 for operating a mass spectrometry system. At 702, the mass spectrometry control system can display a user interface including a plurality of adjustment elements, such as knobs or sliders. The adjustment elements can be used by an operator to set one or more results effective parameters and one or more sample descriptive parameters. The results effective parameters can be used to set a desired result, such as sensitivity, robustness, overall rate of gas consumption, and the like. The sample descriptive parameters can be used to select properties of the sample, such as solvent volatility, compound stability, adduct formation propensity, solvent conductivity, solvent viscosity, compound size, and the like.

At 704, the instrument control system can receive the result effective parameters and sample descriptive parameters from the user interface, and at 706, the instrument control system can determine a set of instrument control parameters. In various embodiments, the instrument control parameters can be based on a chromatographic flow rate and can be modified based on the result effective parameters or sample descriptive parameters. For example, the system can determine the instrument control parameters based on an equation relating the chromatographic flow rate to the instrument control parameter, such as nebulizing gas flow, desolvation gas flow, desolvation gas temperature, or any combination thereof. The result effective parameters or sample descriptive parameters can apply an offset to the equation based on the setting, thereby adjusting the instrument control parameters. In other embodiments, the instrument control parameters can be determined based on the result effective parameters and sample descriptive parameters.

In various embodiments, the number of instrument control parameters determined based on the result effective parameters and sample descriptive parameters can be greater than the number of the result effective parameters and sample descriptive parameters. The instrument control parameters can control various configurable settings of the instrument, such as gas flows (nebulizing gas, desolvation gas, sweep gas, and the like), temperatures (ion inlet temperature, desolvation gas temperature, and the like), voltages (spray voltage, ion inlet voltage, lens potentials, and the like), and the like. At 708, the sample can be analyzed in accordance with the instrument control parameters.

Computer-Implemented System

Figure 8:
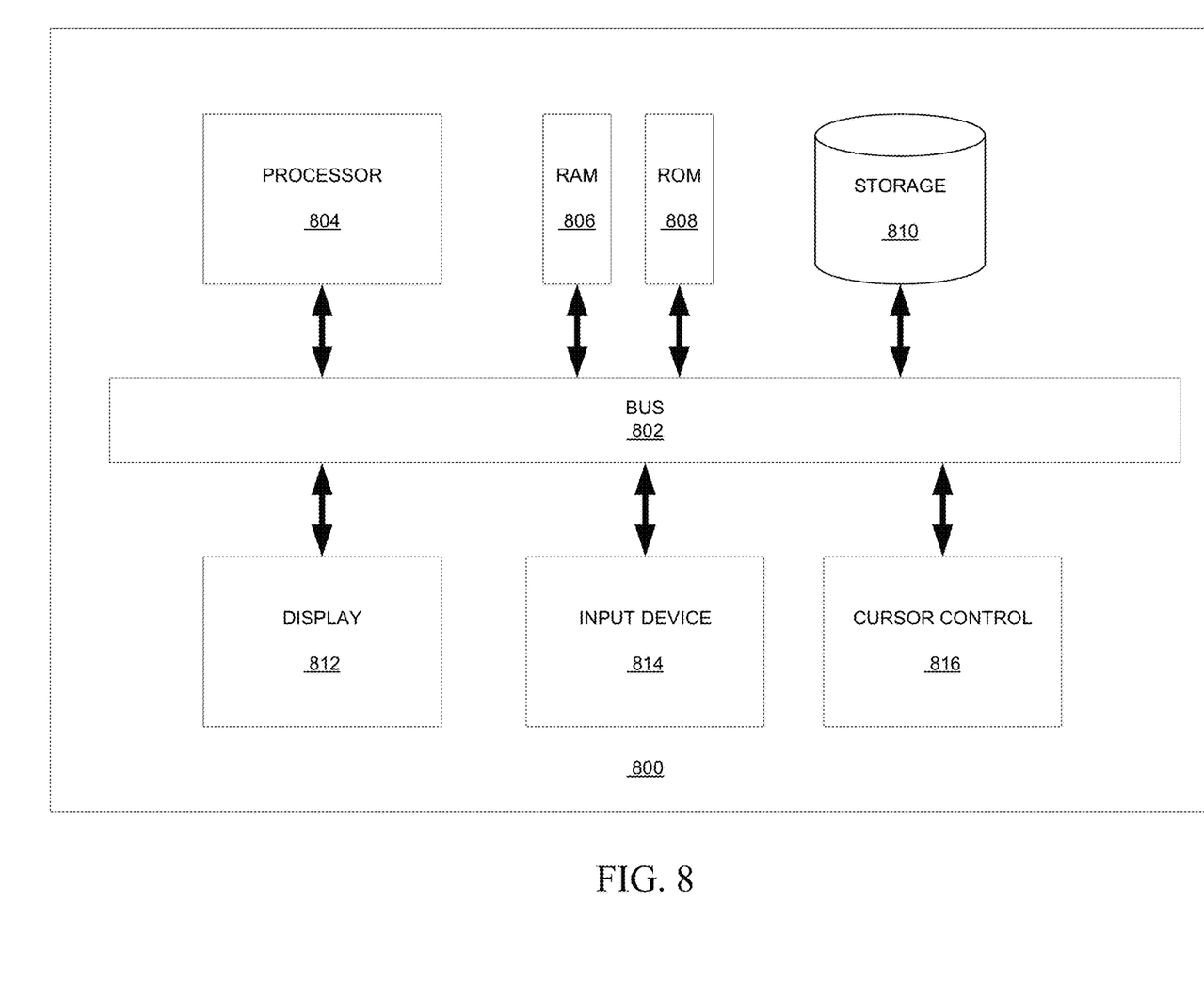
FIG. 8 is a block diagram illustrating an exemplary computer system.

FIG. 8 is a block diagram that illustrates a computer system 800, upon which embodiments of the present teachings may be implemented as which may incorporate or communicate with a system controller, for example controller 108 shown in FIG. 1, such that the operation of components of the associated mass spectrometer may be adjusted in accordance with calculations or determinations made by computer system 800. In various embodiments, computer system 800 can include a bus 802 or other communication mechanism for communicating information, and a processor 804 coupled with bus 802 for processing information. In various embodiments, computer system 800 can also include a memory 806, which can be a random access memory (RAM) or other dynamic storage device, coupled to bus 802, and instructions to be executed by processor 804. Memory 806 also can be used for storing temporary variables or other intermediate information during execution of instructions to be executed by processor 804. In various embodiments, computer system 800 can further include a read only memory (ROM) 808 or other static storage device coupled to bus 802 for storing static information and instructions for processor 804. A storage device 810, such as a magnetic disk or optical disk, can be provided and coupled to bus 802 for storing information and instructions.

In various embodiments, computer system 800 can be coupled via bus 802 to a display 812, such as a cathode ray tube (CRT) or liquid crystal display (LCD), for displaying information to a computer user. An input device 814, including alphanumeric and other keys, can be coupled to bus 802 for communicating information and command selections to processor 804. Another type of user input device is a cursor control 816, such as a mouse, a trackball or cursor direction keys for communicating direction information and command selections to processor 804 and for controlling cursor movement on display 812. This input device typically has two degrees of freedom in two axes, a first axis (i.e., x) and a second axis (i.e., y), that allows the device to specify positions in a plane.

A computer system 800 can perform the present teachings. Consistent with certain implementations of the present teachings, results can be provided by computer system 800 in response to processor 804 executing one or more sequences of one or more instructions contained in memory 806. Such instructions can be read into memory 806 from another computer-readable medium, such as storage device 810. Execution of the sequences of instructions contained in memory 806 can cause processor 804 to perform the processes described herein. In various embodiments, instructions in the memory can sequence the use of various combinations of logic gates available within the processor to perform the processes describe herein. Alternatively hard-wired circuitry can be used in place of or in combination with software instructions to implement the present teachings. In various embodiments, the hard-wired circuitry can include the necessary logic gates, operated in the necessary sequence to perform the processes described herein. Thus implementations of the present teachings are not limited to any specific combination of hardware circuitry and software.

The term "computer-readable medium" as used herein refers to any media that participates in providing instructions to processor 804 for execution. Such a medium can take many forms, including but not limited to, non-volatile media, volatile media, and transmission media. Examples of non-volatile media can include, but are not limited to, optical or magnetic disks, such as storage device 810. Examples of volatile media can include, but are not limited to, dynamic memory, such as memory 806. Examples of transmission media can include, but are not limited to, coaxial cables, copper wire, and fiber optics, including the wires that comprise bus 802.

Common forms of non-transitory computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, PROM, and EPROM, a FLASH-EPROM, any other memory chip or cartridge, or any other tangible medium from which a computer can read.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

In various embodiments, the methods of the present teachings may be implemented in a software program and applications written in conventional programming languages such as C, C++, etc.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A method for operating a mass spectrometry system with a simplified control interface for a mass spectrometry system, comprising:
   receiving a sensitivity/robustness setting, a solvent volatility setting, a compound stability setting from a user, or any combination thereof;
   determining a plurality of instrument control parameters based upon equations relating a chromatographic liquid flow rate to the one or more instrument control parameters and an offset determined based on the received settings, the plurality of instrument control parameters including a nebulizing gas flow, a desolvation gas flow, a sweep gas flow, a desolvation gas temperature, an ion inlet temperature, or any combination thereof; and
   setting the flow rates and/or temperatures of the mass spectrometry system in accordance with the plurality of instrument control parameters.

2. The method of claim 1 wherein the number of the determined instrument control parameters is greater than the number of received settings.

* * * * *